(No Model.)  2 Sheets—Sheet 1.
F. M. DEAN.
AUTOMATIC VALVE FOR TRACK SANDERS.
No. 596,575.  Patented Jan. 4, 1898.
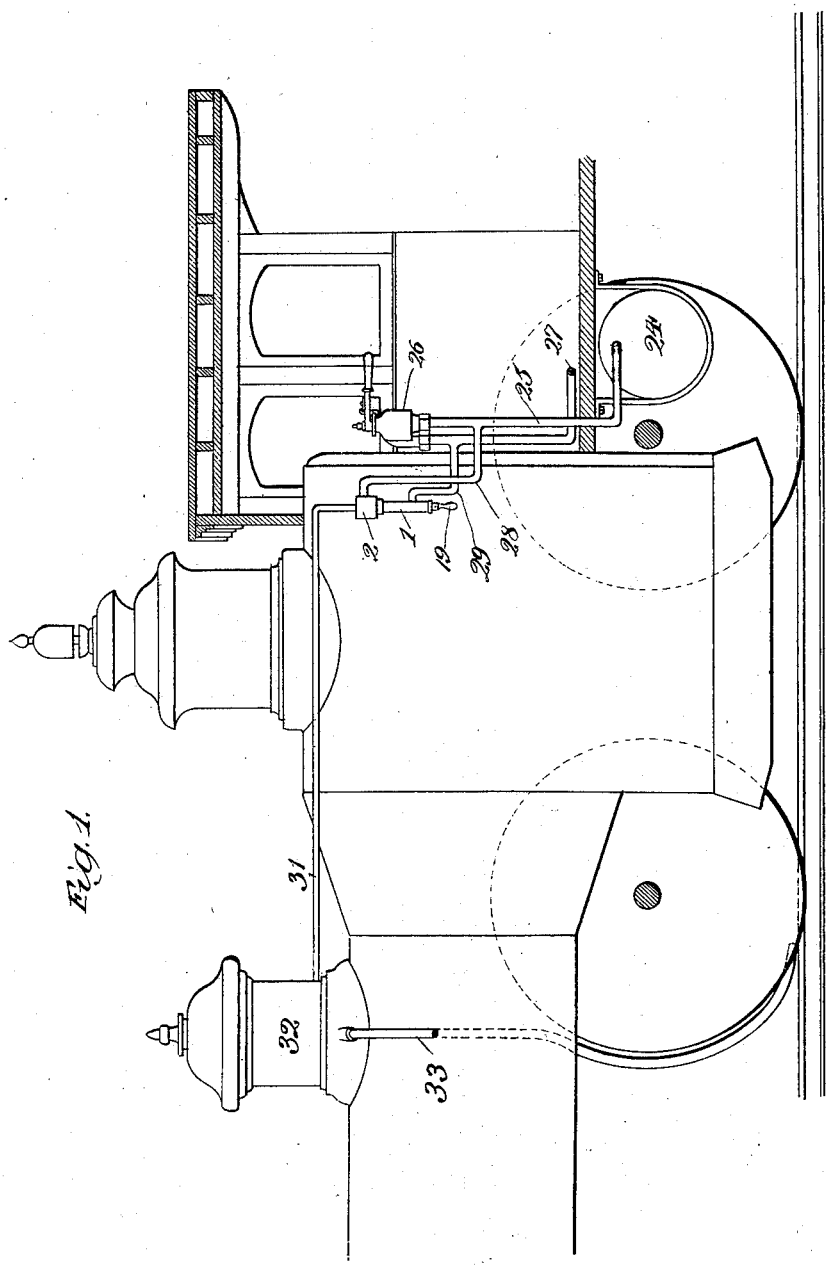
Witnesses:  Inventor:
Francis M. Dean,
By Samuel E. Hibben
Attys (No Model.)　　　　　　　　　　　　　　2 Sheets—Sheet 2.
F. M. DEAN.
AUTOMATIC VALVE FOR TRACK SANDERS.
No. 596,575.　　　　　　　　　　Patented Jan. 4, 1898.
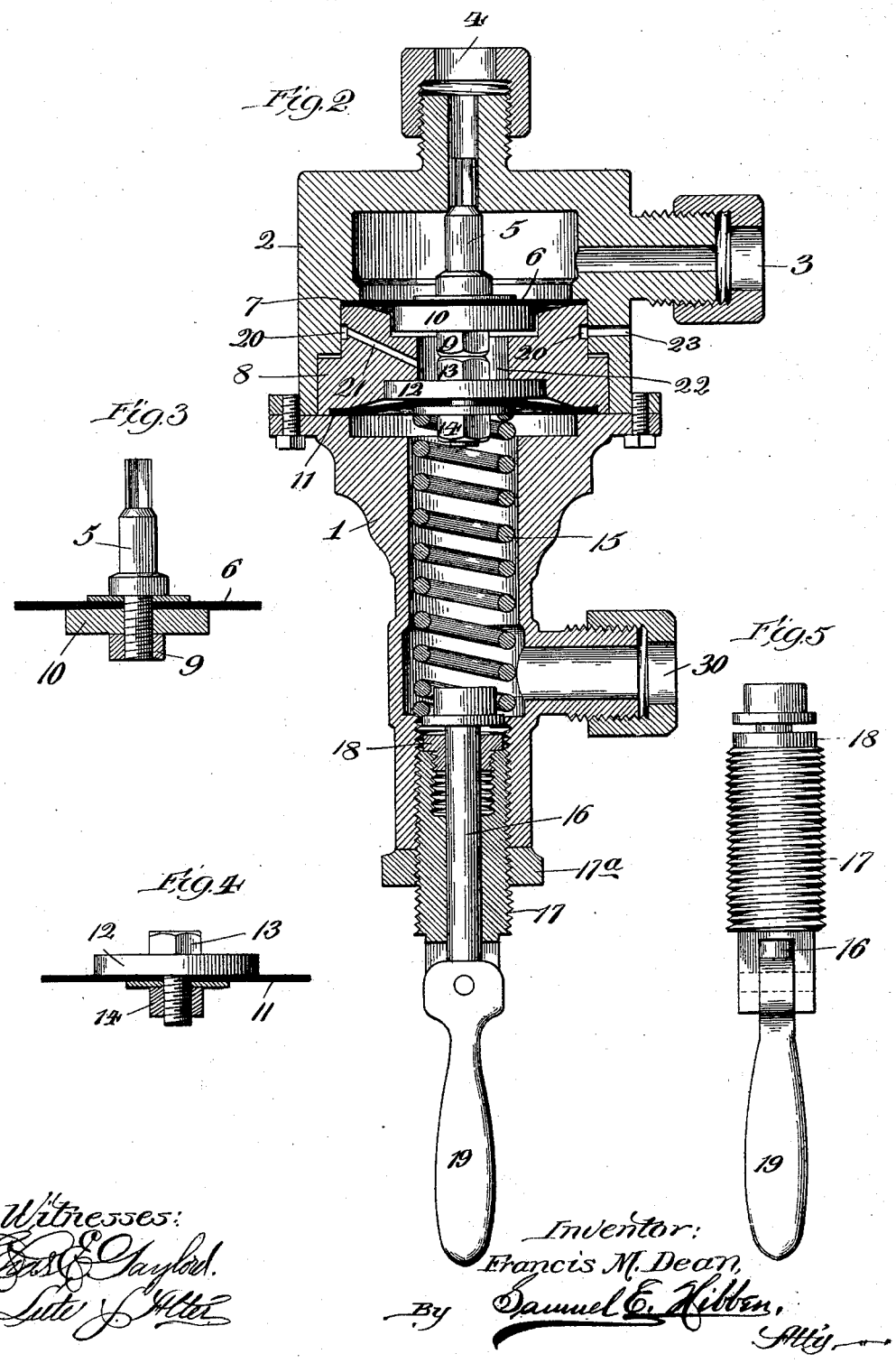
Witnesses:　　　　　　　Inventor:
　　　　　　　　　　　Francis M. Dean,
　　　　　　　　　By Samuel E. Hibben,
　　　　　　　　　　　　　Att'y.

UNITED STATES PATENT OFFICE.

FRANCIS M. DEAN, OF HURON, NORTH DAKOTA.

AUTOMATIC VALVE FOR TRACK-SANDERS.

SPECIFICATION forming part of Letters Patent No. 596,575, dated January 4, 1898.

Application filed June 4, 1897. Serial No. 639,386. (No model.)

*To all whom it may concern:*

Be it known that I, FRANCIS M. DEAN, of Huron, Beadle county, North Dakota, have invented a certain new and useful Automatic Valve for Track-Sanders, of which the following is a specification.

My invention has relation to pneumatic track-sanders; and it consists in general terms in providing novel means working in connection with and under the control of the air-brake system for admitting air-pressure to the sander proper for operating the same, whereby the sander may be operated automatically and simultaneously with the application of the brakes. These means consist of an automatic valve device subject to and operated by the increased differential pressures in the main air-drum and train-pipe caused by reductions of train-pipe pressure in the application of the brakes.

Means under control of the engineer are preferably provided for regulating the operation of the valve according to different degrees of train-pipe-pressure reduction and for preventing the operation of the sander when not required or desired during service applications of the brakes—as, for instance, when passing over interlocking switches, testing of brakes at terminal stations, on turn-tables, &c., and the sander will remain inoperative except during emergency action of the brakes.

In the drawings, Figure 1 is a diagrammatic view showing the application and arrangement of my device with respect to the air-brake system; Fig. 2, a central sectional elevation of the valve; Figs. 3 and 4, detail views of the two diaphragms, respectively; and Fig. 5, a detail of the tension-regulating mechanism.

In the drawings I have selected my complete and preferred form of device for the purpose of clearly describing the nature of my invention, although it will be understood that changes and modifications may be made therein without departing from the scope and spirit of my invention and claims.

The valve device which is the subject of this invention is preferably placed within easy reach of the engineer and is understood to control the air-pressure to any pneumatic sander. It comprises a casing formed of portions 1 and 2, forming an interior chamber containing the operative parts of the device. The upper part of the chamber has a connection 3 with a main reservoir or air-drum of the usual air-brake system and also a connection or outlet-passage 4, leading to the sander. This passage is governed by a valve 5, which is connected to a movable abutment or diaphragm 6 and normally seated on the passage to close it. This diaphragm is held at its edges against a shoulder 7 by means of the diaphragm-seat 8, and its inner edges are beveled to permit of the proper movement of the diaphragm. The valve is secured to the diaphragm in any convenient manner, and, as shown, the screw-threaded valve-stem extends through the diaphragm, and a nut 9, bearing against the disk or washer 10, is screwed on the end thereof.

A second somewhat larger movable abutment or diaphragm 11 is arranged within the valve-casing, and has connected to it a disk 12, with a bolt 13 and a nut 14 for securing the disk to the diaphragm. The seat 8 also forms a seat for this second diaphragm and is also beveled to permit proper movement of the diaphragm.

A coiled spring 15 abuts at one end against the diaphragm 11 and at the other end against the head of a plunger 16. This plunger is adapted to reciprocate within a hollow set-screw 17, which is held in proper position by a lock-nut 17ª. The plunger is kept tight and air-pressure prevented from escaping by the stuffed packing-gland 18.

In the end of the adjusting-screw is pivoted a handle 19, whose pivot is off the center, so that the rounded inner end forms a cam. The plunger rests against this cam end of the handle, which when turned at an angle forces the plunger inward to increase the tension of the spring.

The diaphragm-seat is provided with a cavity or recess 20, communicating by passage 21 with the chamber or space 22 between the diaphragms. The cavity also communicates with a passage 23, extending through the wall of the casing to the atmosphere, so that the space 22 is always at atmospheric pressure.

Fig. 1 clearly shows the application and relation of my sander and automatic valve to the air-supply pipes and engineer's valve on the locomotive, in connection with which brake-valve my sander operates automatically. The usual main air-drum or reservoir 24 is connected by a pipe 25 with the engineer's valve 26, which regulates the pressure in the train-pipe 27 in the usual and well-known manner. Pressure is taken from the reservoir and pipe 25 by a branch pipe 28, leading to the connection 3 in the casing, and the pressure from the train-pipe communicates through branch pipe 29 with the connection 30 in the casing. A pipe 31 leads from the sander connection 4 in the casing to any suitable pneumatic sander contained in the sand-box 32, from which sand is forced through the eduction-pipes 33.

As heretofore stated, the valve-casing is in communication above the diaphragms with the sander and the main reservoir, while the space below the diaphragms is in direct communication with the train-pipe by a passage 30. The area of diaphragm 11 is sufficiently greater than that of diaphragm 6 so that by reason of the proper differential areas the excess pressure in the main reservoir of twenty pounds over train-pipe pressure is overcome. When the parts are in the position shown in Fig. 2, the excess or reservoir pressure of ninety pounds upon the smaller diaphragm 6 is thus equalized by the train-pipe pressure of seventy pounds against the diaphragm 11 of larger area, and the spring, acting in conjunction with the train-pipe pressure, exerts its force to seat the valve.

When train-pipe pressure is reduced by the engineer for the purpose of setting the brakes, the pressure below diaphragm 11 is likewise reduced, allowing the greater pressure above diaphragm 6 to open the valve 5 and be admitted to the sander. In this operation the main-reservoir pressure is sufficient to overcome the spring and the reduced train-pipe pressure. When the engineer's valve is returned to the running position, the pressure in the train-pipe is restored to normal pressure and the main-reservoir pressure is overcome and the valve is in balanced condition, whereupon the spring seats the valve and stops the flow of air to the sander. The air is thus automatically admitted to the sander simultaneously with the application of the brakes and slightly in advance of their setting.

My device may be so adjusted that a slight reduction of train-pipe pressure, insufficient to set the brakes, will operate the sander, so that sand will be already on the rails when the brakes are set after a further reduction, which will result in a correspondingly-increased supply of sand.

The above operation is described as occurring during service application of the brakes; but it is necessary or desirable in a complete and perfect device to cut out the sander and its automatic valve temporarily while passing interlocking switches, during terminal-station testing, or at other times when sand is not required when the brakes are operated, or the sander may be thus cut out to remain inactive at all times during service action, but be operated only in an emergency application or when specially desired by the engineer.

When it is desired to cut out or render the valve inactive in service applications of the brakes, the handle 19 is turned at right angles, forcing the plunger inward and increasing the tension of the spring, under which conditions the valve 5 cannot be unseated except upon an unusual reduction of the train-pipe pressure, as required in emergency action. The spring normally exerts a pressure of, say, five pounds, so that a reduction of this amount or slightly more, as required in service application of the brakes, opens the valve; but when the handle is turned the tension is increased, so that a reduction of, say, twenty pounds, such as is required in practice for emergency, is necessary before the valve can be opened. In opening the valve the pressure from the main reservoir must overcome the total pressure of the train-pipe air and of the spring.

In order to adjust the spring so that the valve may be operated at a lower or greater reduction of pressure and so that the cam may cause an increased or decreased tension, the hollow set-screw device is screwed in or out, whereby the position of the plunger and set-screw is changed with respect to the casing.

The space 22 between the diaphragms is at all times open to the atmosphere, so that if there should be any leaking of air-pressure thereto such pressure may be allowed to escape to prevent the blowing out of or injury to the diaphragms.

It is obvious that the tension adjusting or regulating device, as well as the spring itself, might be omitted, in which case the diaphragm 11 should be made of a sufficiently large area so that the normal train-pipe pressure would itself more than overcome and equalize the excess reservoir-pressure and seat the valve, but in this case there would be no means of cutting out the valve or adjusting it for emergency action only, nor would there be any means of regulating or adjusting the valve device so as to respond or be actuated by different degrees of train-pipe reduction.

I prefer to use double diaphragms, because I am thus enabled to provide for balancing the excess main-air-drum pressure and the train-pipe pressure by making the diaphragm exposed to the train-pipe pressure of the larger diameter and also because the lower or train-pipe diaphragm can act as a protection to the upper diaphragm, so that it cannot be destroyed by excess pressure from either side. If only one diaphragm were interposed between the two pressures and if a rupture of the main air-drum or connections should occur, the train-pipe pressure would at once destroy the diaphragm and render the device inoperative, whereas by using double diaphragms with a space therebetween to atmosphere the device is reliable and safe under all conditions and the diaphragms are secure from being destroyed by either pressure. Furthermore, I prefer to use the pressure direct from the main air-drum, because a direct connection with such ready supply of pressure can be easily made and also because such direct connection insures the prompt operation of the sander preferably slightly in advance of the application of the brakes. Prompt operation is also insured by the excess pressure stored therein.

Although I have described more or less precise forms and details of construction, I do not intend to be understood as limiting myself thereto, as I contemplate changes in form, proportion of parts, and the substitution of equivalents as circumstances may suggest or render expedient without departing from the scope of my claims.

I claim—

1. In a railway-track-sander system the combination of a casing having a chamber, a movable abutment therein dividing such chamber into two separate compartments, one of which compartments has communication with a track-sanding device and with a main reservoir of an air-brake system and the other of which compartments has communication with the train-pipe whereby train-pipe pressure and main-reservoir pressure are exerted in opposition, a valve actuated by the abutment to govern the communication to the track-sanding device and a spring exerting its tension against the abutment to assist the train-pipe pressure in holding the valve closed.

2. The combination with a pneumatic track-sander and the train-pipe and main reservoir of the air-brake system of a valve governing admission of pressure to the sander for operating the same, such valve being balanced by the normal pressures in the main reservoir and train-pipe and actuated by variations in train-pipe pressure.

3. The combination, with a pneumatic track-sander of a casing having an interior chamber, a movable abutment dividing such chamber into two separate, non-communicating compartments, one of the compartments having communication with the track-sander and with the main air-drum or reservoir of an air-brake system, and the other compartment having communication with the train-pipe whose pressure acts upon the abutment in opposition to the main-air-drum pressure, and a stem carried centrally by the abutment and whose end is adapted to govern the communication or port to the track-sander.

4. The combination with a pneumatic track-sander having communication with the main reservoir of the air-brake system, of a valve governing such communication and adapted to be held seated to close communication between the sander and the reservoir when the train-pipe pressure is normal, but adapted to be operated to open such communication when the train-pipe pressure is reduced in the application of the brakes a movable abutment for operating said valve, and adjustable tension mechanism tending to close the valve.

5. A valve for admitting pressure to a railway track-sander from the main reservoir of the air-brake system, comprising, in combination with a sander and the air-brake system, a casing having communication respectively with the sander, main reservoir and train-pipe and a valve therein governing the communication between the reservoir and sander and openable upon reductions of train-pipe pressure in the application of the brakes.

6. An automatic valve device for admitting pressure to a railway track-sander comprising, in combination with a sander and the air-brake system, a casing having communication respectively with the sander, main reservoir and train-pipe and a diaphragm-valve device actuated in one direction by main-reservoir pressure and in the other by train-pipe pressure and governing communication between the reservoir and sander.

7. An automatic valve device for admitting pressure to a railway track-sander comprising, in combination with a sander and the air-brake system, a casing connected respectively with the sander, main reservoir and train-pipe and a valve actuated by the main-reservoir pressure and train-pipe pressure operating on the valve in opposition to govern the passage of air from the main reservoir to the sander.

8. An automatic valve device for admitting pressure to a railway track-sander comprising, in combination with a sander and air-brake system, a valve governing a connection between the main reservoir and the sander, and under the influence of main-reservoir and train-pipe pressure, such valve being balanced by the normal pressures of the main reservoir and the train-pipe, and a spring forcing the valve to its seat.

9. In combination with a railway track-sander and the air-brake system, a valve-casing having connections respectively with the sander, main reservoir, and train-pipe, a valve-stem therein governing the admission of air from the reservoir to the sander, a diaphragm connected to the valve-stem and interposed in the casing between the main reservoir and train-pipe connections.

10. A valve device for automatically admitting air to a track-sander from the air-brake system comprising a casing having connections respectively with the sander, main reservoir and train-pipe, a diaphragm therein against which the main-reservoir pressure acts, a stem or valve-body connected to the diaphragm to govern the passage from the reservoir to the sander, and a second diaphragm adjacent to the first diaphragm and acted upon by the train-pipe pressure, the normal pressures on the diaphragms acting in opposition and balancing each other to permit the valve to be seated to close the passage, and the reduction of train-pipe pressure in the application of the brakes causing a withdrawal of the valve through the greater pressure of the reservoir.

11. In combination with a railway pneumatic track-sander and the air-brake system, a valve governing admission of air to the sander and having main-reservoir pressure exerted on one side against train-pipe pressure on the other, the valve being opened by main-reservoir pressure when the train-pipe pressure is reduced upon the application of the brakes.

12. In combination with a railway pneumatic track-sander and the air-brake system, a casing having connections respectively with the sander, main reservoir and train-pipe and double diaphragms therein, and a valve controlled thereby for governing the admission of main-reservoir air to the sander.

13. The combination with the air-brake system, with an excess-pressure main reservoir, of a pneumatic track-sander, a casing having connections respectively with the sander, main reservoir and train-pipe and double diaphragms therein of different areas, the train-pipe pressure on one diaphragm opposing and equalizing the excess reservoir-pressure on the other diaphragm, and a valve governing the passage from the main reservoir to the sander and opened by the excess reservoir-pressure on its diaphragm, when the train-pipe pressure is reduced, simultaneously with the application of the brakes.

14. A valve for automatically admitting main-reservoir pressure from an air-brake system to a track-sander, comprising a casing having connection respectively with the sander, main reservoir and train-pipe, a diaphragm therein against which the reservoir-pressure acts, a valve connected thereto and governing the passage of air from the reservoir to the sander, the valve-stem extending or projecting through the diaphragm, a second diaphragm in the casing against which the train-pipe pressure acts, and a projecting disk upon the second diaphragm in contact with the projecting stem of the first diaphragm.

15. A valve for admitting main-reservoir pressure from the air-brake system to a track-sander, comprising, in combination with a sander and the air-brake system, a casing having connection respectively with the sander, main reservoir and train-pipe, double diaphragms therein exposed respectively to reservoir and train-pipe pressure and having a space or chamber between them, a valve connected to one of the diaphragms for admitting pressure to the sander and a passage for maintaining the space between the diaphragms at atmospheric pressure.

16. In combination with a pneumatic sander and the air-brake system, a valve-casing, a connection therefor with the main reservoir, train-pipe and sander respectively, a diaphragm in the casing, a valve connected thereto for governing admission of pressure to the sander, a diaphragm-seat for holding the diaphragm in position, and a second diaphragm also held in position by such seat, the first diaphragm being exposed to reservoir-pressure and the second diaphragm to train-pipe pressure.

17. The combination with a pneumatic track-sander and the train-pipe and main reservoir of the air-brake system, of a valve device in balanced condition when the train-pipe and reservoir pressures are normal, such valve controlling admission of pressure to the sander, a spring for holding the valve closed when the same is in such balanced condition but adapted to be overcome to allow the valve to open when the train-pipe pressure is slightly reduced and means for increasing the tension of the spring to require a greater reduction of train-pipe pressure to cause an opening of the valve.

18. The combination with a pneumatic track-sander and the train-pipe and main reservoir of the air-brake system, of a valve device for admitting main-reservoir pressure to the sander and under the direct control of train-pipe pressure, such valve device being operated in response to variations of train-pipe pressure, and adjustable tension mechanism tending to close the valve.

19. The combination with a pneumatic track-sander and the train-pipe and main reservoir of the air-brake system, of a valve device controlling admission of pressure to the sander and under the direct action of train-pipe pressure, a spring holding the valve to its seat at normal train-pipe pressure, a reciprocating plunger in the casing, the spring contacting at one end of the valve device and the plunger at the other end and means for forcing and holding the plunger inward to increase the tension of the spring.

20. A valve for admitting pressure to a pneumatic railway track-sander from the air-brake system comprising a casing having connection with the reservoir, train-pipe and sander respectively, a valve device therein for admitting pressure to the sander and operated by variations in train-pipe pressure, a spring acting in conjunction with train-pipe pressure to hold the valve closed, a plunger working in the casing and contacting the spring, means for regulating the position of the plunger in the casing and means for reciprocating the plunger.

21. The combination with a pneumatic track-sander and the train-pipe and main reservoir of the air-brake system, of a casing in direct communication with the sander, train-pipe and reservoir, a valve device therein for controlling admission of reservoir-pressure to the sander and under the direct action of train-pipe pressure, a spring holding the valve to its seat at normal train-pipe pressure and acting in conjunction with such latter pressure, a reciprocating plunger in the casing contacting one end of the spring and a cam device for forcing the plunger inward to increase the tension of the spring.

22. The combination with a sander and the air-brake system, of a casing having a main-reservoir connection 3, a sander connection 4, and train-pipe connection 24, double diaphragms 6 and 11 exposed respectively to reservoir and train-pipe pressure, a diaphragm-seat 8 separating the diaphragms, a valve 5 connected to diaphragm 6 for controlling the sander connection, stems upon the diaphragms and in contact with each other, a spring 15 abutting diaphragm 11, a plunger 16, and a handle having a cam end contacting the plunger.

23. The combination with a pneumatic sander and the air-brake system, of a casing having connections respectively with the sander, main reservoir and the train-pipe, double diaphragms 6, and 11, exposed respectively to reservoir and train-pipe pressure, a diaphragm-seat 8, separating the diaphragms, a valve 5, connected to diaphragm 6 for controlling the sander connection, a spring 15 abutting diaphragm 11, a hollow set-screw 17 in the casing, a handle 19, having a cam end pivoted in the set-screw and a plunger 16, contacting the spring.

24. The combination with a pneumatic sander and the air-brake system, of a casing having connections respectively with the sander, main reservoir and the train-pipe, a valve device therein for admitting pressure to the sander, a spring acting in conjunction with train-pipe pressure to hold the valve closed, a hollow set-screw in the casing, a plunger working in the set-screw and contacting the spring and a handle pivoted to the set-screw and having a cam end in contact with the end of the plunger.

FRANCIS M. DEAN.

Witnesses:
FREDERICK ROLLINS,
J. F. REDFIELD.

It is hereby certified that the residence of the patentee in Letters Patent No. 596,575, granted January 4, 1898, upon the application of Francis M. Dean, for an improvement in "Automatic Valves for Track-Sanders," was erroneously written and printed "Huron, North Dakota;" whereas said residence should have been written and printed *Huron, South Dakota;* and that the said Letters Patent should be read with this correction therein that the same may conform to the record of the case in the Patent Office.

Signed, countersigned, and sealed this 25th day of January, A. D., 1898.

[SEAL.]

WEBSTER DAVIS,
*Assistant Secretary of the Interior.*

Countersigned:
   A. P. GREELEY,
      *Acting Commissioner of Patents.*